United States Patent [19]

König et al.

[11] 3,936,511

[45] Feb. 3, 1976

[54] PROCESS FOR THE PRODUCTION OF ACRYLONITRILE-VINYL CHLORIDE COPOLYMERS

[75] Inventors: Joachim König, Schildgen; Carlhans Süling, Odenthan-Hahnenberg, both of Germany

[73] Assignee: Bayer Aktiengesellschaft, Leverkusen, Germany

[22] Filed: July 11, 1974

[21] Appl. No.: 487,648

[30] Foreign Application Priority Data
Jan. 8, 1973 Germany............................ 2300713

[52] U.S. Cl............ 260/881; 260/85.5 XA; 260/898
[51] Int. Cl.²......................................... C08L 33/20
[58] Field of Search............. 260/898, 881, 85.5 XA

[56] References Cited
UNITED STATES PATENTS

| | | | |
|---|---|---|---|
| 2,420,330 | 5/1947 | Shriver et al. | 260/84 |
| 2,520,959 | 9/1950 | Powers | 260/92.8 |
| 2,763,631 | 9/1956 | Coover et al. | 260/881 X |
| 2,894,927 | 7/1959 | Elder et al. | 260/29.6 |
| 3,732,336 | 6/1971 | Duke et al. | 260/881 |

Primary Examiner—Carman J. Seccuro
Attorney, Agent, or Firm—Plumley & Tyner

[57] ABSTRACT

The invention relates to a process for the production of acrylonitrile-vinyl chloride copolymers, consisting of 20 – 85 % by weight of acrylonitrile and of 80 – 15 % by weight of vinyl chloride wherein the process is carried out in the presence of a latex of acrylonitrile-vinyl chloride copolymer.

3 Claims, 1 Drawing Figure

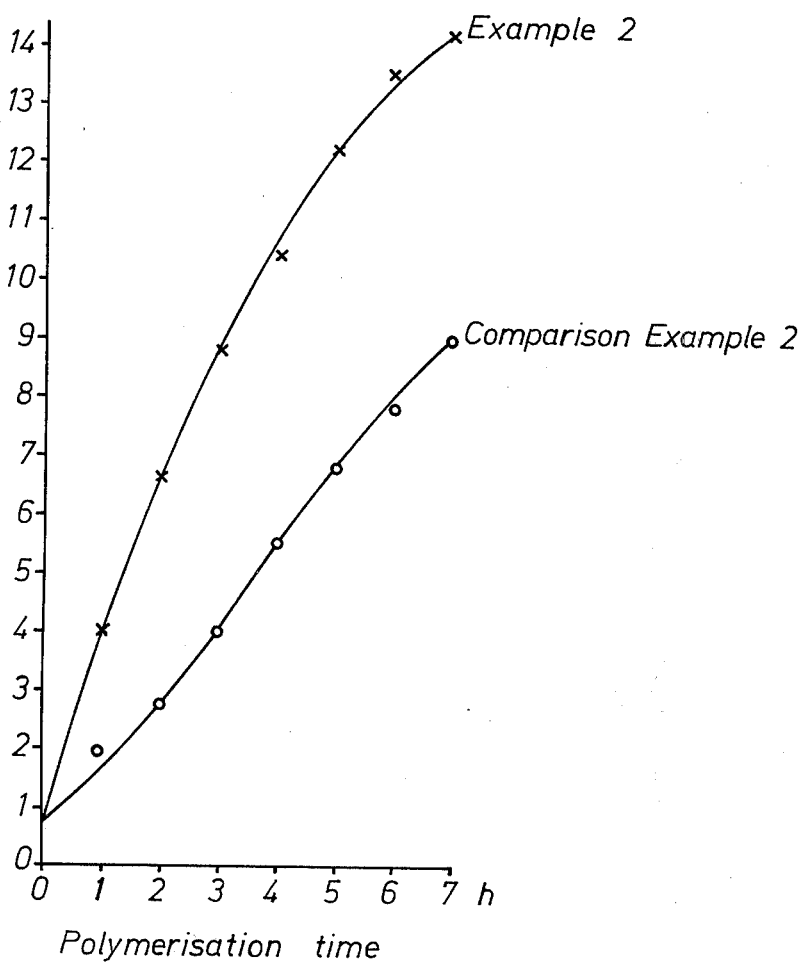

PROCESS FOR THE PRODUCTION OF ACRYLONITRILE-VINYL CHLORIDE COPOLYMERS

This invention relates to a process for the copolymerisation of acrylonitrile and vinyl chloride and, optionally, other copolymerisable compounds with an improved volume-time yield.

Copolymers containing 20 to 85 % by weight of acrylonitrile and 80 to 15 % by weight of vinyl chloride are suitable for the production of filaments and fibres of the so-called modacrylic type. In addition to the usual favourable properties, modacrylics are highly flameproof as a result of their chlorine content, so that they are eminently suitable for use as a wig material and in the production of weaving fleeces, children's clothing, carpets, decorative materials, drapes and curtains.

It is known that acrylonitrile-vinyl chloride copolymers can be obtained by emulsion polymerisation. The emulsion polymerisation process is carried out with the usual catalysts, for example persulphates, percarbonates and hydrogen peroxide, and optionally in the presence of reducing compounds such as amines, mercaptans, pyrosulphite and emulsifiers, for example alkyl sulphonates, alkylaryl sulphonates, sodium lauryl sulphate and sodium dioctyl sulphosuccinate. In many cases, it has also proved to be of advantage to use a buffer system for keeping the pH-value constant.

The copolymerisation of acrylonitrile with vinyl chloride is characterised by the different reactivities of the monomers, the acrylonitrile being much more reactive than the vinyl chloride (cf. J. Brandrup and E. H. Immergut, Polymer Handbook, Interscience Publ., New York 1966). A polymerisation reaction in which the entire monomer mixture is introduced at the same time results in the formation of highly irregular products which cannot be used as a fibre material because polymers extremely rich in acrylonitrile are formed at the beginning of the reaction, whereas polymers extremely rich in vinyl chloride are formed towards the end of polymerisation when the concentration of acrylonitrile diminishes. The individual components of the polymer mixture are incompatible with each other, and it is not possible to produce useful spinning solutions. In order to obtain uniform polymers with a definite AN:AC ratio, polymerisation has to be carried out semi-continuously, a certain monomer ratio AN:VC has to be adjusted at the beginning of polymerisation and the monomer ratio kept constant by continuing to supply the more quickly consumed acrylonitrile and, optionally, other components such as, for example, the initiator. In general, all the vinyl chloride is introduced at the beginning of polymerisation, although it is also possible, if desired, to introduce part of the vinyl chloride during the polymerisation reaction. In addition, polymerisation has to be carried out at relatively low temperatures in order to obtain uniform products with good fibre properties. The slow polymerisation velocity at these temperatures is a disadvantage since relatively long polymerisation times are required if high yields are to be obtained.

It is known that the time required to induce polymerisation can be shortened by the addition of a starting latex and that uniform and concentrated latices can be obtained by polymerisation onto the polymer particles initially introduced (cf. for example Houben-Weyl, Vol. XIV/1, page 339 and U.S. Pat. No. 2,520,959). In the process described in U.S. Pat. No. 2,520,959, the starting latex initially introduced is used to prepare concentrated latices, the polymerisation conditions being regulated in such a way that it is only the polymer particles present which continue to grow, and no new latex particles are formed. The effect of this procedure is such that polymerisation takes place extremely slowly being slower for larger sizes and smaller numbers of latex particles.

Surprisingly, it has now been found that the polymerisation velocity of this semi-continuous polymerisation process can be considerably increased by adding to the initial polymerisation mixture a small quantity of a starting latex of acrylonitrile-vinyl chloride copolymer, and that the fibre properties of the polymer are improved in this way.

In contrast to the known process, the size of particles remains constant during polymerisation in the process according to the invention, instead the number of particles is increased by approximately 50 times. In addition, it has been found that by adding the starting latex a much higher polymerisation velocity is obtained throughout the entire polymerisation process, giving an improved volume-time yield of polymer and a better conversion, based on vinyl chloride. Improved yields, based on vinyl chloride, are also obtained.

Therefore it is an object of this invention to increase the polymerisation velocity in a copolymerisation of acrylonitrile with vinyl chloride.

It is another object of this invention to produce uniform acrylonitrile-vinyl chloride copolymers.

Further objects will be evident by the description and the examples.

These objects are accomplished by a process for production of acrylonitrile-vinyl chloride copolymers, comprising 20 to 85 % by weight of acrylonitrile and 80 to 15 % by weight of vinyl chloride by emulsion polymerisation with a large excess of vinyl chloride and with continuous introducing of acrylonitrile wherein polymerisation is carried out in the presence of a starting latex of acrylonitrile-vinyl chloride copolymer.

In one preferred embodiment, polymerisation is carried out in the absence of heavy metal salts at temperatures of from 5 to 40°C. It has also proved to be of particular advantage to carry out polymerisation at temperatures of from 15 to 25°C.

If, therefore, it is desired to obtain a polymer with a precisely defined AN:VC ratio from this polymerisation reaction, it is possible, by using a starting latex initiator, to introduce a larger quantity of acrylonitrile over a certain period of time without changing the monomer ratio AN:VC, and hence to obtain a higher yield of polymer in the same times.

If, for comparison, two semi-continuous polymerisation reactions are carried out in the manner described, the only difference between them being that a starting latex is added to one polymerisation mixture at the beginning of polymerisation, although equal quantities of acrylonitrile and initiator are introduced over the same periods, the different polymerisation velocities of both mixtures produce the following results: the mixture containing the starting latex gives a high yield of a product with the required acrylonitrile and vinyl chloride contents, whilst the mixture with out the starting latex gives a poor yield of a product with an excessively high acrylonitrile content and an excessively low vinyl chloride content. In the second case, the monomer ratio AN:VC changes after the beginning of polymerisation because the acrylonitrile is not consumed at a rate commensurate with that at which it is introduced into the polymerisation autoclave, on account of the slower reaction velocity, but instead accumulates in the monomer mixture giving a higher monomer ratio AN:VC and a corresponding higher polymer ratio AN:VC is also obtained.

In order to obtain a polymer identical with that obtained in the first case, therefore, the quantity of acrylonitrile introduced has to be reduced to such an extent that the monomer ratio AN:VC remains constant and the quantity of acrylonitrile introduced corresponds to the quantity of acrylonitrile consumed.

Accordingly, the advantage of the process according to the invention over conventional processes is that, by adding a starting latex, the copolymerisation of acrylonitrile/vinyl chloride can be carried out with improved volume-time yields in a shorter time. The composition of starting latex is not critical, however, a latex is preferred which has a similar composition as the polymer to be produced.

The products thus obtained are soluble in for example, acetone, acetonitrile and dimethyl sulphoxide; have a high degree of thermal stability; liberate only a little hydrochloric acid both in solid form and also in solution, even at elevated temperature; have a high affinity for dyes and can be processed both by wet spinning and also by dry spinning into highly flameproof fibres and filaments with outstanding textile properties.

The following examples are to further illustrate the invention without limiting it. In the examples the parts quoted are parts by weight.

EXAMPLE 1

16,200 parts of deionised water, 32 parts of sodium pyrosulphite, 80 parts of sodium lauryl sulphate, 20.5 parts of sodium acetate (anhydrous), 15 parts of acetic acid, 800 parts of a latex of acrylonitrile-vinyl chloride copolymer with a 5 % solids content (analysis data chlorine 29.3 %, nitrogen 12.25 %, AN/VCl = 47.3 : 52.7, K-value according to Fikentscher 72.3) and 250 parts of acrylonitrile, are introduced into a polymerisation autoclave. The autoclave is rinsed with nitrogen, 4,200 parts of vinyl chloride are introduced under pressure and a temperature of 20°C is adjusted. Polymerisation is initiated by the addition of 13.5 parts of potassium persulphate in 300 parts of deionised water, after which 170 parts of acrylonitrile and a solution of 4.5 parts of potassium persulphate in 100 parts of water are continuously pumped in hourly. After 7 hours, a solids content of 12.4 % is obtained and the latex is run off from the autoclave, precipitated with acetone and worked up. 2660 parts of polymer are obtained with a chlorine content of 30.0 %, a nitrogen content of 11.76 % (AN:VC ratio = 45.7 : 54.3) and a K-value of 67.6 (0.5 % solution in dimethyl formamide, 25°C) (according to Fikentscher, Cellulosechemie 13, 58 (1932).

COMPARISON TEST 1

The procedure is as described above, except that the starting latex is left out. After a polymerisation time of 7 hours, a solids content of 9.0 % is obtained. Working up gives 1370 parts of polymer with a chlorine content of 25.4 %, a nitrogen content of 14.2 % (AN:VC = 54.6 : 45.4) and a K-value of 86.5.

Accordingly, this test which is carried out in the absence of the starting latex gives a much poorer yield of polymer than the test described in Example 1 because of the slower reaction velocity. In addition, the polymer does not have the required composition because the acrylonitrile content of the polymer is too high and the vinyl chloride content too low.

COMPARISON TEST 2

In order to obtain a product similar to that obtained in accordance with Example 1, the test described in Example 1 is repeated without the starting latex and with only 130 parts of acrylonitrile per hour. A solids content of 9.0 % is obtained after 7 hours' polymerisation. Working up gives a yield of 1650 parts of polymer with a chlorine content of 29.6 %, a nitrogen content of 12.14 % (AN:VC = 46.8 :53.2) and a K-value of 68.5.

Although this polymer has the required composition in accordance with Example 1, the yield is considerably lower than in Example 1 because of the slower polymerisation velocity.

EXAMPLE 2

The procedure of Example 1 is repeated in the presence of a starting latex of an acrylonitrile/vinyl chloride copolymer (5 % solids content, analysis Cl 30.8 %, N 11.22 %, Acn/VC = 43.9 : 56.1, K-value 62.6) and with 130 parts of acrylonitrile per hour. A solids content of 14.2 % is obtained after 7 hours' polymerisation. The yield amounts to 2160 parts of polymer with a chlorine content of 32.7 %, a nitrogen content of 10.7 % (AN:VC = 41.3 : 58.7) and a K-value of 66.0.

If this polymerisation test is compared with comparison test 2, from which it is distinguished solely by the starting latex added, the solids content measured hourly clearly shows the higher polymerisation velocity in Example 2 (cf. FIG. 1).

EXAMPLE 3

16,200 parts of deionised water, 32 parts of sodium pyrosulphite, 80 parts of sodium dioctylsulphosuccinate, 20.5 parts of sodium acetate (anhydrous), 15 parts of acetic acid, 800 parts of a latex of acrylonitrile-vinyl chloride copolymer with a solids content of 4 % (analysis Cl = 26.4 %, N = 13.48 %, AN/VCl = 52.3 : 47.7, K-value 75.9) and 250 parts of acrylonitrile, are introduced into a polymerisation autoclave. After rinsing with nitrogen, 4,200 parts of vinyl chloride are introduced under pressure. Polymerisation is initiated at 20°C by the introduction of 13.5 parts of potassium persulphate in 300 parts of deionised water, after which 140 parts of acrylonitrile and a solution of 4.5 parts of potassium persulphate in 100 parts of water are continuously pumped in hourly. After 7 hours, a solids content of 11.1 % is obtained and the latex is run off from the autoclave, precipitated with acetone and worked up. Working up gives 1920 parts of polymer with a chlorine content of 30.95 %, a nitrogen content of 11.24 % (AN:VC ratio = 43.9 : 56.1) and a K-value of 87.0.

COMPARISON TEST 3

The procedure is as in Example 3, but without the starting latex. A solids content of 8.8 % is obtained after 7 hours' polymerisation. Working up gives 1,220 parts of polymer with a chlorine content of 29.4 %, a nitrogen content of 12.65 % (AN:VC = 48.1 : 51.9) and a K-value of 95.0.

This test which is carried out without the starting latex also gives a much poorer yield of polymer than in Example 3 on account of the slower polymerisation velocity. In addition, the polymer does not have the required composition as in Example 3 because the acrylonitrile content of the polymer is too high and its vinyl chloride content too low.

We claim:

1. In the process for the production of acrylonitrile-vinyl chloride copolymers comprising 20 to 80% by weight of acrylonitrile and 80 to 15% by weight of vinyl chloride by emulsion polymerization; the improvement comprising conducting the emulsion polymerization at a temperature of 5° to 40°C. by adding acrylonitrile, as the sole added monomer, to a starting emulsion containing, in addition to a large excess of vinyl chloride, a latex of acrylonitrile-vinyl chloride copolymer, whereby the volume-time yield of copolymer and conversion of vinyl chloride is increased compared to the corresponding process conducted in the absence of said latex of acrylonitrile-vinyl chloride copolymer in the starting emulsion; the product of said process having a uniform acrylonitrile:vinyl chloride ratio and having good fiber properties.

2. The process of claim 1, wherein said polymerisation is carried out at temperatures of from 15° to 25°C.

3. Process of claim 1 carried out in the absence of heavy metal salts.

* * * * *